United States Patent [19]

Davidian

[11] Patent Number: 5,297,073
[45] Date of Patent: Mar. 22, 1994

[54] INTEGER DIVIDE USING SHIFT AND SUBTRACT

[75] Inventor: David Davidian, Cambridge, Mass.

[73] Assignee: NEC Electronics, Inc., Mountain View, Calif.

[21] Appl. No.: 932,393

[22] Filed: Aug. 19, 1992

[51] Int. Cl.$^5$ .............................................. G06F 7/52
[52] U.S. Cl. .............................................. 364/766
[58] Field of Search .............................. 364/766, 767

[56] References Cited

U.S. PATENT DOCUMENTS

| | | | |
|---|---|---|---|
| 4,460,970 | 7/1984 | McClary | 364/766 |
| 4,466,077 | 8/1984 | Iannucci et al. | 364/766 |
| 4,546,447 | 10/1985 | Sawada | 364/767 |

*Primary Examiner*—David H. Malzahn

*Attorney, Agent, or Firm*—Skjerven, Morrill, MacPherson, Franklin & Friel

[57] ABSTRACT

In accordance with the present invention, a method of performing arithmetic division on a data flow machine is disclosed which resolves some of the inefficiencies associated with the conventional subtract until carry method. This method eliminates many of the numerous subtraction operations characterizing the conventional method by performing trial multiplications in the same way long hand division is performed. Furthermore, the method is implemented using data flow techniques to enhance the speed of the division by performing functions in parallel with a minimal memory requirement. As a result of this invention, integer division is performed using fewer clock cycles than a conventional Von Neuman implementation.

5 Claims, 5 Drawing Sheets

INTEGER DIVIDE USING SHIFT AND SUBTRACT

BACKGROUND OF THE INVENTION

1. Field of the Invention

The present invention relates to arithmetic integer division and particularly to arithmetic integer division implemented on data flow processors.

2. Description of the Relevant Art

The conventional computer system, formulated by John Von Neuman, consists of a central processing unit (a CPU) which sequentially operates on data and instructions held in memory. An instruction is read from memory into the CPU, decoded, then executed. Data is read from memory and operated upon. New data is generated and stored in memory. These sequence of steps are repetitiously performed in the conventional Von Neuman computer architecture. On the average, every other step involves memory access. This memory access path has been characterized as the "Von Neuman bottleneck." This condition becomes critical when there is more than one processor wanting to access the same memory at the same time. Additional hardware and software overhead is required to control and synchronize the processors.

The entire computational system of a Von Neuman-based computer is based upon a clock for sequential operation of the processor. A Von Neuman processor is a sequential machine. That is, each step in the computation has a pre-defined place in time. These processors are of a deterministic nature, as demonstrated by most all software which is executed in an in-line manner. One can trace the execution of this software (code) and the CPU is expected to process each line of code sequentially.

An alternative computer architecture called "data flow" resolves some of the inefficiencies of the conventional computer. In data flow processors, like the NEC $\mu$PD7281, program control is decentralized by allowing data to independently govern their own operations within the computer system.

In a traditional CPU each step in the placing of information into and out of the CPU is centrally controlled. In a data flow processor each piece of data knows where it is going to. A transportation analogy can be made as follows: imagine every automobile in the country had to be controlled by a central sequencer, directing the flow of every car at every step of the way from start to finish. This is exactly the condition that exists in a conventional Von Neuman CPU. However, what allows so much automobile traffic to flow as smooth as it does, in general, is that each automobile knows where to go and how to get there. The latter defines data control in a data flow architecture.

There is no predetermined sequence of instructions in a data flow machine. Data elements are independently made autonomous by associating a label or tag with the data element instructing the data element where to go and what to do when it gets there. The basic element in data flow architecture consists of the data element together with its label and is called a "token". Tokens flow along links to the functions that will operate upon them. The token waits at the function until all other tokens containing the required operands arrive. Only when a matched set of tokens is provided will the function be executed. The operation results in the generation of new tokens which independently flow to their assigned functions. In other words, data flow execution is defined by having enough information at a particular point to be processed. If not enough data is available, no execution takes place. The data flow processor will execute operations on data sets that are sufficient.

It would appear that the flow of data in a data flow machine is disorganized, but data flow software and hardware work together to keep the flow of tokens organized to prevent information traffic jams from occurring. For example, queues can serve as traffic lights to hold data tokens in transit when their destination functions are busy. A data flow program is written as a description of a graph, which is basically a map of a city of functions and interconnecting links which the tokens are to traverse during the operation of the program.

In contrast to traditional Von Neuman architectures, data flow architecture allows operations to be performed essentially in parallel. Each token moves independently of the others, and each function is evaluated independently of the others as soon as a sufficient data token set arrives. If the token is not destined for the particular processor, it just moves on. In addition, a scalar increase in performance is achieved in connecting multiple data flow processors together. This is not the case with traditional processors, which have a finite upper limit of performance in parallel.

As a result of the inherently parallel nature of a data flow machine and the autonomous nature of the token in data flow architecture, the time required for accessing memory for instructions or data is eliminated. While some tokens wait to be matched, other matched tokens are being processed, instead of waiting their turn in memory. This allows for a more efficient execution of programming instructions than in the traditional Von Neuman machine.

Arithmetic division is the most cumbersome of the elementary arithmetic operations to implement on a computer. The conventional method of performing arithmetic division on a computer is to take the denominator and continually subtract it from the numerator until a carry condition occurs (the remainder is smaller than the denominator). For comparably sized operands, this is efficient, however, when the denominator is much smaller than the numerator, a relatively large number of subtractions must be performed to arrive at an answer. For example, in performing the division 65,536/1, the conventional method requires 65,536 subtractions to arrive at the result.

The conventional method of subtract until carry is inherently serial, and is widely used in classic Von Neuman serial computers. Any adaptation of this method to data flow computing would still inherit the serial inefficiency of numerous repetitive subtractions. Data flow processing can streamline the conventional subtract until carry method somewhat by updating counters or indices while simultaneously performing subtractions, however, the same number of subtractions would still have to be performed.

SUMMARY OF THE INVENTION

An alternative shift and subtract method of performing arithmetic subtraction is presented as an alternative to the inefficiencies of the conventional method on Von Neuman processors. This method is further characterized in its similarity to long hand division.

In performing long hand division with a numerator N and denominator D, trial multiplications are performed to find an appropriate multiplier M so that $N - M*D$ gives the smallest possible positive result (* denotes ordinary arithmetic multiplication). This process is repeated with the result of the subtraction becoming a new numerator, until the new numerator is less than the denominator. This process of trial multiplications to choose a multiplier M, if implemented digitally on a computer, would eliminate the need to perform $2^n$ subtractions as required by the conventional process to arrive at the partial quotient, where n is a positive integer which depends on the relative sizes of the operands N and D. Therefore, each well-chosen multiplier M in the sequence of performing the long hand division can save $2^n$ subtractions over the conventional method. Furthermore, in emulating long hand division on a data flow machine, many of the functions can be performed in parallel, resulting in a method of performing arithmetic division which is substantially more efficient than the conventional subtract until carry method implemented on Von Neuman processors.

DETAILED DESCRIPTION

Figure 1A:
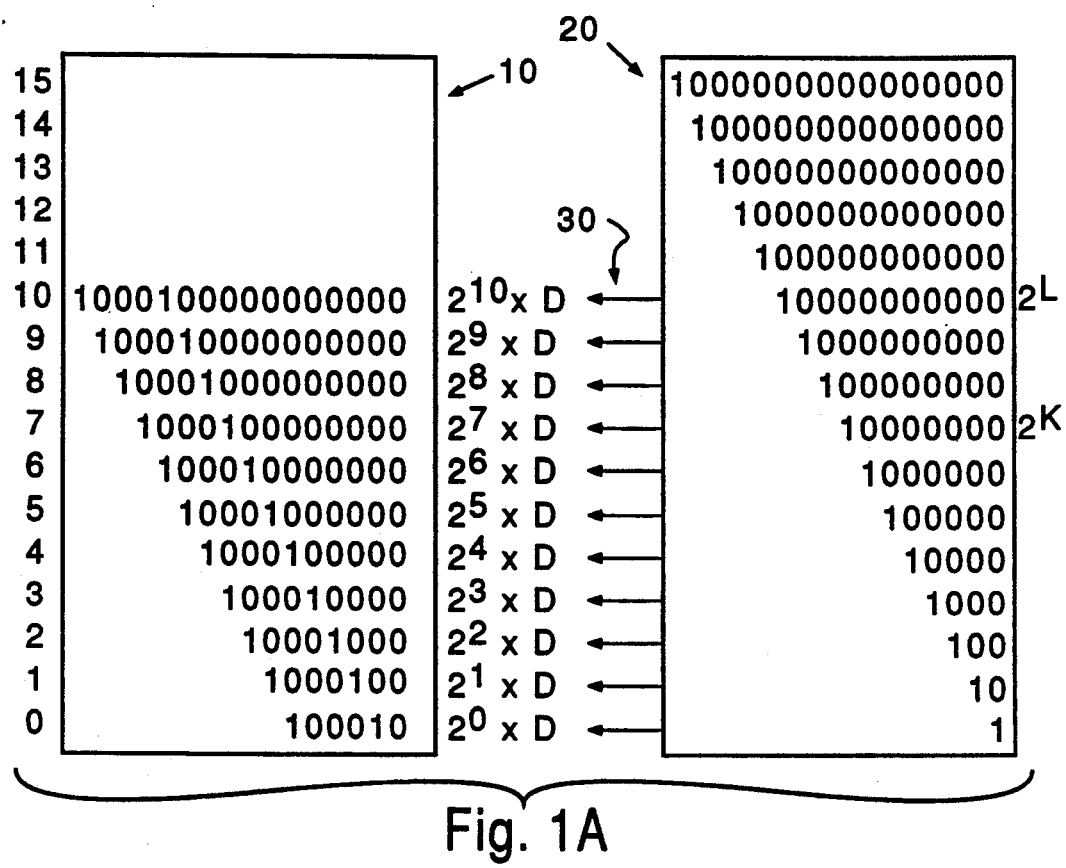
FIGS. 1A and 1B are diagrams illustrating the present invention with a numerical example.

An alternative method of performing arithmetic division on a computer using data flow processing which resolves the inefficiencies of the conventional method is described below. The present method computes an arithmetic division much faster than the conventional method, and furthermore, the time required for any division is independent of the relative sizes of the operands.

The present invention is described with reference to FIG. 1A and FIG. 1B. The present method is applied to an example. While the operands are integers, this method is easily modified to perform division on floating point operands to any desired accuracy by changing the representation.

In this example the division to be performed is $6512/34 = 191$ with a remainder of 18. The numerator N and denominator D are input in 16 bit binary representation. Thus the numerator 6512 is represented by binary number 1100101110000 and the denominator 34 is represented as 100010.

A determination is made of the number of leading zeroes L in the denominator. This number is stored for later reference. In this example, with a denominator of 0000000000100010, there are $L = 10$ leading zeroes.

A table of mask entries 10 is generated from the binary denominator. This table of mask entries is formed by starting with the denominator 100010 and forming successive entries by shifting the denominator to the left by one bit, or equivalently, multiplying the denominator by successive powers of 2, until the most significant bit of the denominator is at bit 15 (assuming conventional indices 0–15 for each digit). The largest entry in the table is obtained by shifting the denominator to the left by the number of leading zeroes L which was determined beforehand.

Associated with the mask entry table 10 is a table of trial multipliers 20. This table is simply the binary representation of the numbers $2^0$, $2^1$, through $2^{15}$. A correspondence is made between the entries of the two tables wherein binary $2^0$ in the table of trial multipliers 20 is associated with the lowest value in the table of mask entries 10, namely the denominator 100010. The binary value of $2^1$ in the trial multiplier table 20 is then associated with the next lowest value 1000100 in the mask entry table 10 etc. as indicated by the arrows 30 in FIG. 1A.

Numbers in the mask entry table 10 are subtracted from the numerator, beginning with the largest mask entry number $1000100000000000 = 2^L*D$. The trial subtraction is performed with successively lower numbers in the mask entry table 10 until a positive result is obtained. In the present example, a first occurrence of a positive result is obtained by subtracting the 7th entry $2^L*D = 1000100000000$ in the mask entry table 10. This subtraction is shown in FIG. 1B. The result of the subtraction is stored as a new numerator N. The trial multiplier corresponding to the 7th entry in mask entry table 10 is binary $2^7$. This value is read into memory to be accumulated in the final quotient. Note that this value is the multiplier of the denominator which yields the 7th entry in the mask entry table 10, i.e. $2^7*34 = 8704$ which is 1000100000000.

It would be preferable, however, to determine the number of leading zeroes K in the numerator and perform the first trial subtraction with the value $D*2^x$, since this is the first trial subtraction which yields a positive new numerator. Note that in the present example the number of leading zeroes in the numerator is $K = 7$ and the first trial subtraction yielding a positive new numerator is $D*2^7$. This eliminates the need to perform trial subtractions with the first three mask entry table values $D*2m^{10}$, $D*2^9$ and $D*2^8$.

The process is now repeated with the new value of the numerator N. As above, a mask entry table number is selected which when subtracted from the new numerator results in the smallest positive value, which for the present example becomes the next new numerator N. For the present example, it is the 5th entry 10001000000 of the mask entry table 10 or, equivalently, $2^5$ times the denominator. Accordingly a new numerator $N = 10000110000$ is stored for the next iteration and the corresponding trial multiplier $2^5$ from the trial multiplier table 20 is read into memory.

Figure 1B:
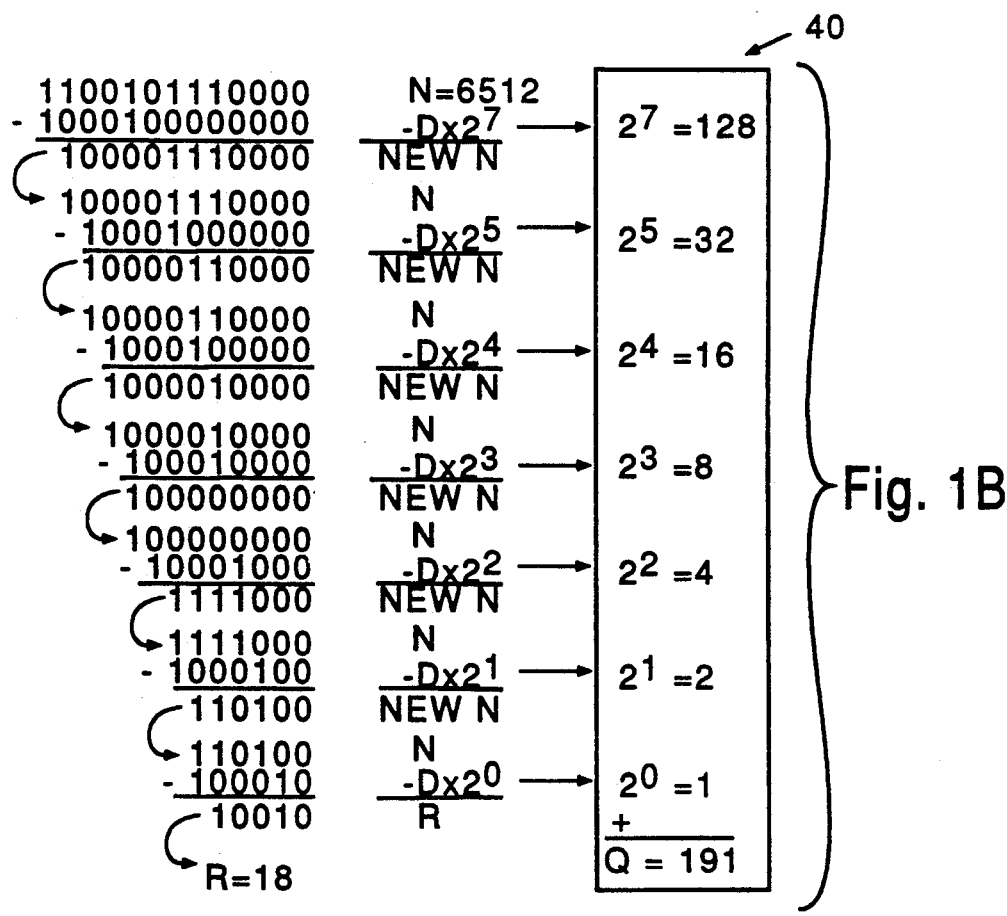

As shown in FIG. 1B, this sequence of steps is continued until a new numerator is obtained which is smaller than the smallest value in the mask entry table 10. This last new numerator is essentially the remainder $R = 18$. The selected trial multipliers are summed in 40 to give the final quotient Q. In the present example, this sum is $Q = 191$, which is the correct answer.

The above method is suited for implementation on a data flow processor because some steps in the sequence can be performed in parallel, thus executing the division more efficiently. Furthermore, for most calculations, the present method requires fewer subtractions. For the present example, 6512/34 would have required at least 191 subtractions of 34 from 6512. As shown in FIG. 1B, the present method required only $L = 10$ subtractions to arrive at the answer.

In one embodiment of the present invention, an alternative "shift and subtract" method of division is implemented using the NEC μPD7281 data flow processor with reference to FIG. 1A and 1B and the data flow chart of FIG. 3.

The trial multiplier table 20 of FIG. 1A is loaded into a storage location as the array MASK through the L__MASK link at F10 of FIG. 3. This table is just values of $2^0$ through $2^{15}$. The numerator N and denominator D enter along data links L__NUMR and L__DENOM, with the numerator queued at the function FN with a token from link L__C. Tokens along links L__A, L__B, and L__C serve to indicate that all necessary counters, etc., have been initialized. The numerator queue at FN prevents calculations from taking place prematurely.

The NOPSC(XY) operation at function F00 determines the number L of leading zeroes in the denominator. F00 passes the denominator value through link L00 to function F02. The number of leading zeroes L is passed along link L01 to a function F01 where 5 copies of this value are made. These copies are to clear the queue index at function F22 and set the number SC of copies of right shifted denominators required to form the table of mask entries 10, and set the number of accumulated sub-quotients from the trial multiplier table 20 to add before outputting the answer.

One copy of L passes to function F318 causing a read of zero to be performed by the RDCYCS ZER operation. The zero value is passed along link L39 to function F319. This operation SETCTL FTT empties the queue at F22 by outputting a token which stores the zero value at location 5H where the counter parameters for the queue function of F22 are stored. This initializes the queue of F22 for subsequent operations. Function F320 uses the COUNT 1 operation to terminate the token. A second token is output from F319 to undergo an NOP operation, which serves to delay the token for one clock cycle. The token then proceeds to function F310 where it is counted.

A second copy of L passes from F01 to function F30. F30 reads a value of 15 from memory and subtracts the number of leading zeroes L to form the value 15−L. This value is passed in a token along L30 to function F31. This operation, SETCTL FTT at F31 passes the value 15−L as a parameter to the RDCYCS operation of function F24 located at address 10H. The value 15−L becomes a pointer indicating which value in the trial multiplier table 20, which has been stored as the array MASK, is to be the first candidate multiplier. By passing this value to the RDCYCS operation of function F24, the 15−L th array element is read as the first candidate multiplier. Function F313 uses the COUNT 1 operation to terminate the token. A second token is output from F31 to undergo an NOP operation, which serves to delay the token for one clock cycle. The token then proceeds to function F310 where it is counted.

A third copy of L passes from F01 to function F32. F32 reads a value of 6 and performs 6 binary left shifts on the number of leading zeroes L. The shifted number of leading zeroes passes to function F34. At this function SETCTL FTL passes tokens containing the shifted number of leading zeroes as an argument to the COPYBK operations of F06 and F07 which are located at memory locations 15H and 16H respectively. When passed as an argument in this fashion, L becomes the operative parameter SC in these COPYBK operations. Accordingly, these COPYBK operations at F06 and F07 will make SC=L copies of their respective input tokens. Functions F315 and F316 use the COUNT 1 operation to terminate the tokens. A third token is output from F34 to undergo an NOP operation, which serves to delay the token for one clock cycle. The token then proceeds to function F310 where it is counted.

A fourth copy of L passes from F01 to the function F36. At F36 the value COUNT__OP is read from memory. The COUNT__OP value, in binary form represents the instruction for the COUNT operation. This value is OR'd with the number of leading zeroes from F01. The number of leading zeroes L in general is a number less than 16, which in 16-bit binary representation will be preceded by at least 11 zeroes. The binary representation for the COUNT operation reserves the last 8 bits of the instruction code for the count parameter. Thus, the OR operation places L as a parameter SC for the COUNT operation of function F27 stored at memory address 20H. Accordingly, the count operation COUNT SC at F27 will count SC.(=L) tokens for accumulation. This counts the number of subtractions to be performed. Function F317 uses the COUNT 1 operation to terminate the token. A second token is output from F37 which proceeds to function F310 where it is counted.

When the above functions initialized by the four copies of L have set or cleared the appropriate registers, four input tokens will have been counted at F310. At this time, the two copies of the last input token are output along links L37 and L38. One copy is terminated at F311. The other passes along L38 to the function F312, where three copies are made to be output along the links L__A, L__B, and L__C.

At F02 the denominator D is queued with the data along L02, a fifth copy of the number of leading zeroes L from F01. The SHL(XX) function takes the denominator D and does a left bit shift L times so that its highest order bit is in the most significant bit position, stripping off all leading zeroes, or equivalently, multiplying the denominator by $2^L$, thus forming a normalized left shifted denominator $2^L*D$.

The dot 50 on the queue input at F02 for the copy of L sets the operand precedence for the SHL(XX) function. Since the SHL(XX) function takes two operands in sequence (the number to be shifted and the number of times the shift is to be performed) some distinction between the two input values needs to be made. This is accomplished by the dot 50, which allows the data along L00 (denominator D) to pass to the SHL(XX) function before the data from F01. The dots shown on the inputs to other functions serve the same purpose.

The normalized left shifted denominator passes along links L06 and L07 to functions F03 and F04, which are queues waiting for data along links L__A and L__B to arrive before the normalized left shifted denominator proceeds further.

The functions F05, F06, F07 and F010 work together to create the table of mask entries 10 of FIG. 1A.

When data along L__A arrives at F05, the normalized left shifted denominator $2^L*D$ passes along L08 to F05, causing a zero value to be read from storage which passes to F06 along L010. A number of copies of this zero value is made at the COPYBK SC,1 operation at function F06. This operation makes SC copies of the zero value and at the same time increments each successive copy by 1 to form a series of tokens containing the values 1, 2, . . . , SC along the link L011. The value of SC has been set above to be the number of leading zeroes.

Meanwhile, when data along L__B has arrived at F04, a copy of the normalized left shifted denominator passes along L09 to F07 where SC non-incremented copies are made by the COPYBK SC, 0 operation.

The COPYBK operations of F06 and F07 output end tokens indicating the last copy has been made. No use is made of these token at the present time, however they do need a place to go, which is provided in the functions F08 and F09.

F010 generates the specified number of right shifts of the normalized left shifted denominator which appears along link L015, subsequently queued up at F22 as the next mask entry table number to be subtracted from the new numerator. Function F010 successively takes an incremented value from F06 along with a copy of the normalized left shifted denominator from F07 and performs a right shift on the latter by the number of bits specified by the former. The resulting output along link L015 is a series of shifted denominators which forms the table of mask entries 10 shown in FIG. 1A.

The numerator N enters along L_NUMR to be queued at FN with data from link L_C. When data along L_C arrives, the numerator is allowed to pass along L_N to F20 where it is written into memory before being passed to F22, where the subtraction is performed.

The actual calculation happens in the center of the flow chart with F22 doing the work. The numerator N is queued with the first shifted denominator from F010. When the queue is satisfied, the first shifted denominator $2^L*D$ is subtracted from the numerator N at the SUB:GE:BRC function. The SUB operation performs the subtraction. The GE operation controls the carry bit of the result based on whether the result is greater than or equal to 0. The BRC operation controls the destination of the subtraction result based on the GE condition.

If the subtraction result in F22 is greater than or equal to zero, indicating that $2^L$ is a partial quotient (a well chosen multiplier), the GE operation will set the carry bit of the positive subtraction result to 1 and the BRC operation directs the result out along the "TRUE" link L23 to F25, where 3 copies are made. One copy flows along L_N back up to F20 where it is written as a new numerator in the NUMR memory location for the next subtraction to be performed with the succeeding mask entry table element from F010.

A copy of the positive subtraction result from F25 flows along link L25A to function F24 causing a read of a MASK array value from the trial multiplier table. This particular RDCYCS instruction reads successive memory addresses at each operation. The first value of the trial multiplier table MASK to be read by this operation will be the 15-Lth entry, as specified previously in the above description of function F31. Since this is the first read of the trial multiplier table 20 of FIG. 1A, the value read will be $2^L$. Subsequent reads will yield $2^{L-1}$, $2^{L-2}$, ... and so on. The MASK value read flows along link L26 to the function F26 to be queued with a second copy of the positive subtraction result from F25. The NOP function delays the second copy for one clock cycle before it is to be used as a flag to initiate the next operation at F26.

When the subtraction result is positive, F26 first receives a selected multiplier MASK value from F24 which sits in a queue. A copy of the positive subtraction value is then received from F25 along L23A. The carry bit of the positive subtraction value has been set, as described above, by the GE operation. Both values then proceed to the AND:CNOP operation of F26. The AND:CNOP is a conditional AND operation which depends on the relative values of the carry bits of the operands. In the case of the positive subtraction result, the carry bit of the selected multiplier from the MASK array has not been set while the positive subtraction result is a positive value for which the carry bit has been set. When the carry bits of the operands differ, as in the case of a positive subtraction result, the AND:CNOP operation does not perform an AND operation on the operands. The selected multiplier MASK value simply passes through the AND:CNOP operation as a token along L27 to become a partial quotient accumulated in the final answer.

A negative subtraction result at F22 indicates that the first candidate partial quotient $2^L$, which multiplies the denominator D to form the shifted denominator $2^L*D$ from F010, is too large a multiplier. In this case the negative subtraction result flows along L22 to F23 which makes three copies of the negative subtraction result.

One copy of the negative subtraction result flows along L21 to F21 to cause the last numerator previously stored to be read and passed to F22 for the next trial subtraction with the next shifted denominator $2^{L-1}*D$ from F010.

A second copy of the negative subtraction result is passed along link L24 to F23B causing a zero to be read and passed along L24B to be queued at F26.

The third copy of the negative subtraction result passes along L25 to F23A where the NOP operation causes a one clock cycle delay. The negative subtraction result then proceeds to function F24 which causes a subsequent trial multiplier MASK value to be read, thus incrementing the next address for the next read of a trial multiplier at F24. The trial multiplier thus caused to be read by the third copy of the negative subtraction result should not be accumulated, since it is too large a multiplier. This is taken care of in function F26.

When the subtraction result is negative, function F26 first receives the zero value read in F23B which sits in a queue. F26 then receives the selected multiplier MASK value from F24. The carry bit of the negative subtraction result wa not set in F22 when the subtraction resulted in the negative value. The carry bit of the zero value has not been set. The operands of the AND:CNOP operation therefore have the same carry bit values causing the AND operation to be performed on the selected multiplier MASK value and the zero value. The result is a zero valued token passing along L27. In this way, the read of trial multiplier MASK values is incremented and inappropriately large trial multipliers only contribute a zero value as a partial quotient to the accumulation of the final answer.

Subsequent trial subtractions are performed with the succeeding values in the table of shifted denominators (mask entry table 10 of FIG. 1A) flowing into F22 along from F010 from updated numerators until all the shifted denominators have been applied in the subtraction at F22. All the partial quotients thereby provided are collected at function F27.

At function F27, partial quotients are counted by the COUNT SC operation so that SC partial quotients are accumulated in a sum to provide the full quotient. The operation COUNT SC which determines the number of partial quotient values to be added has been previously constructed by functions F36 and F3 in memory location 20H where the value SC has been set to L, the number of leading zeros in the denominator.

When SC=L subquotients are accumulated at F26, the quotient is passed along L28 to function F28, which makes two copies of the result. One copy flows to function F29 along L29 to be output as the final answer. The other flows along L210 to function F21D causing a read of the last numerator NUMR, the last positive subtraction result, to be output as the remainder.

A computer program to implement the above embodiment is included as part of this specification.

Figure 2:
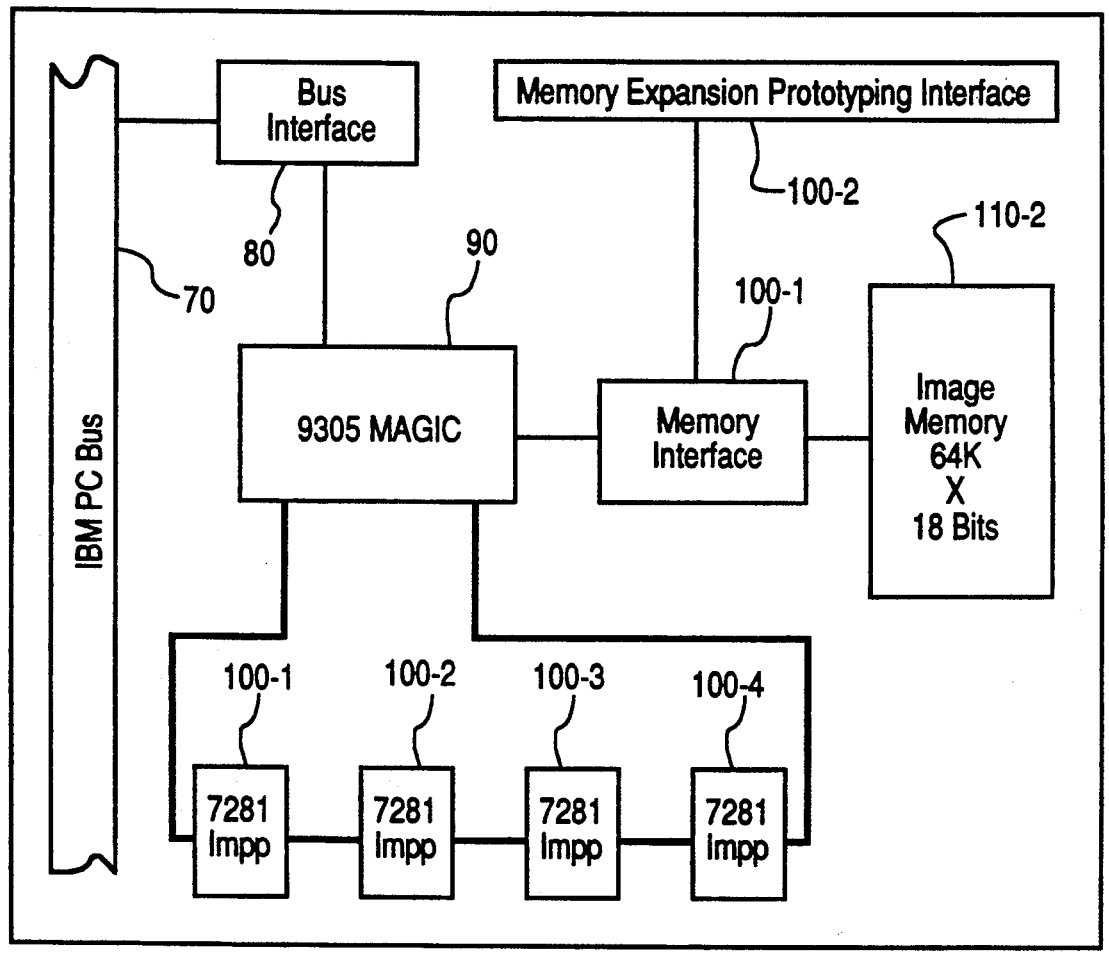
FIG. 2 is a block diagram of the DF-1 circuit board on which an embodiment of the neural network simulation is implemented.

A typical system configuration for the implementation of the present invention is shown in the block diagram of FIG. 2. FIG. 2 shows the DF-1 Board block diagram. The DF-1 board provides peripheral data flow processors which work in parallel with the host CPU of an IBM PC or compatible. There are four interconnected μPD7281 data flow processors, each of which has a designated hexadecimal module number 8 through B respectively. The present embodiment described above can be implemented on any one of these four data flow processors, thus leaving the other three for auxiliary data flow processing related to specific applications such as image processing. Data can be input directly in the form of tokens from the host CPU or from one or more of the three remaining μPD7281 data flow processors.

Figure 3A:
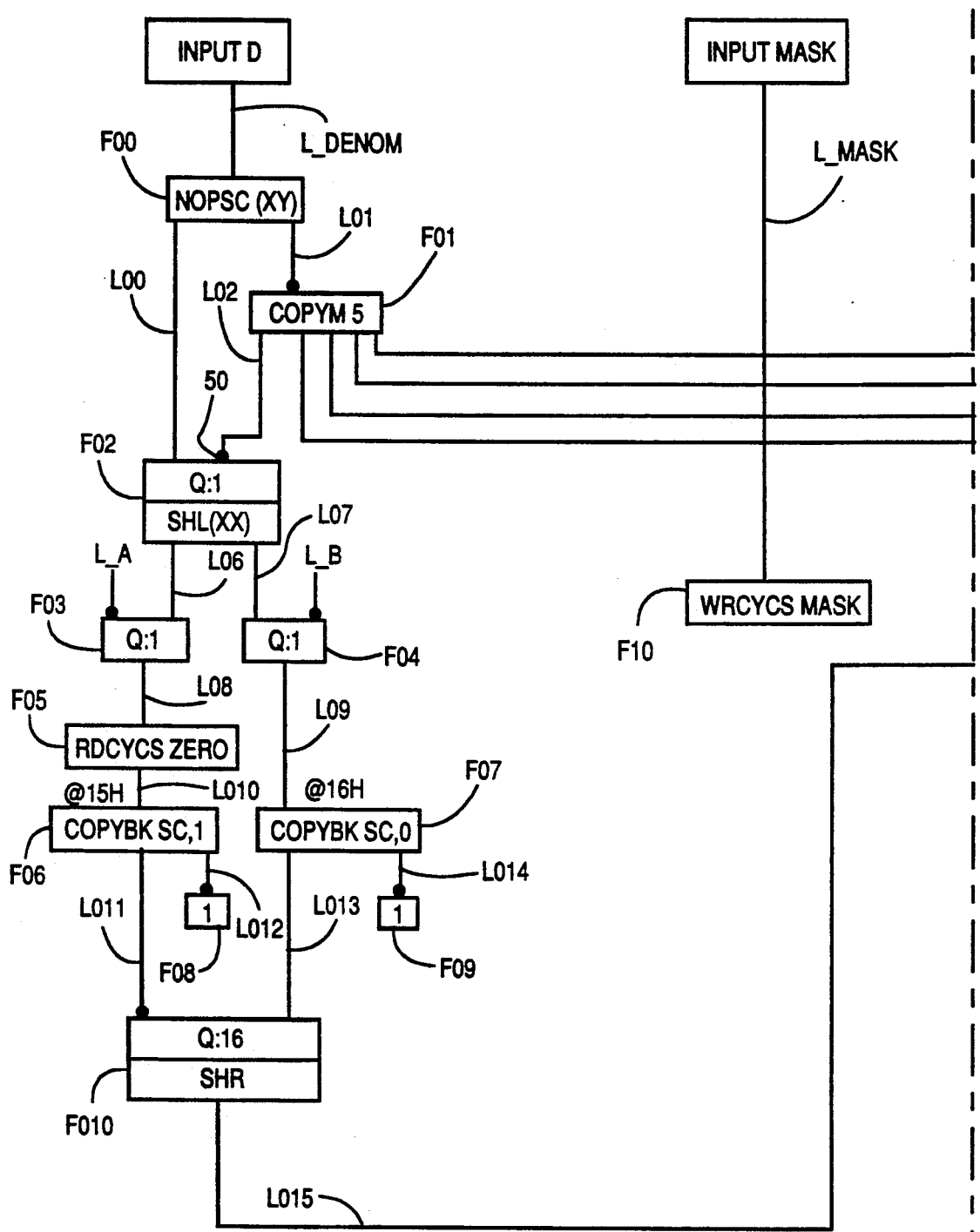
FIGS. 3A, 3B and 3C together illustrate a flow graph corresponding to a computer program which implements an embodiment of the present invention.
Figure 3B:
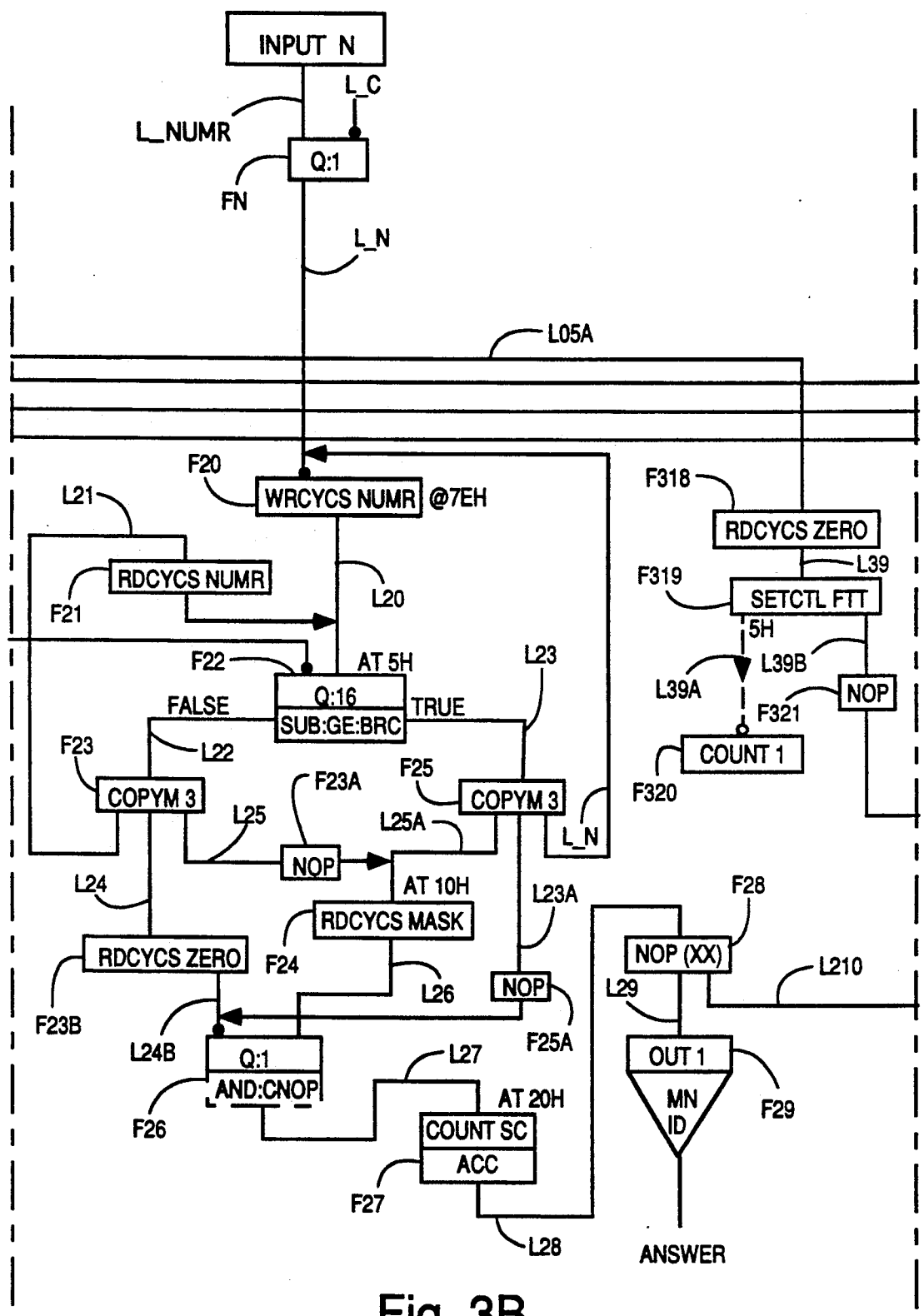
Figure 3C:
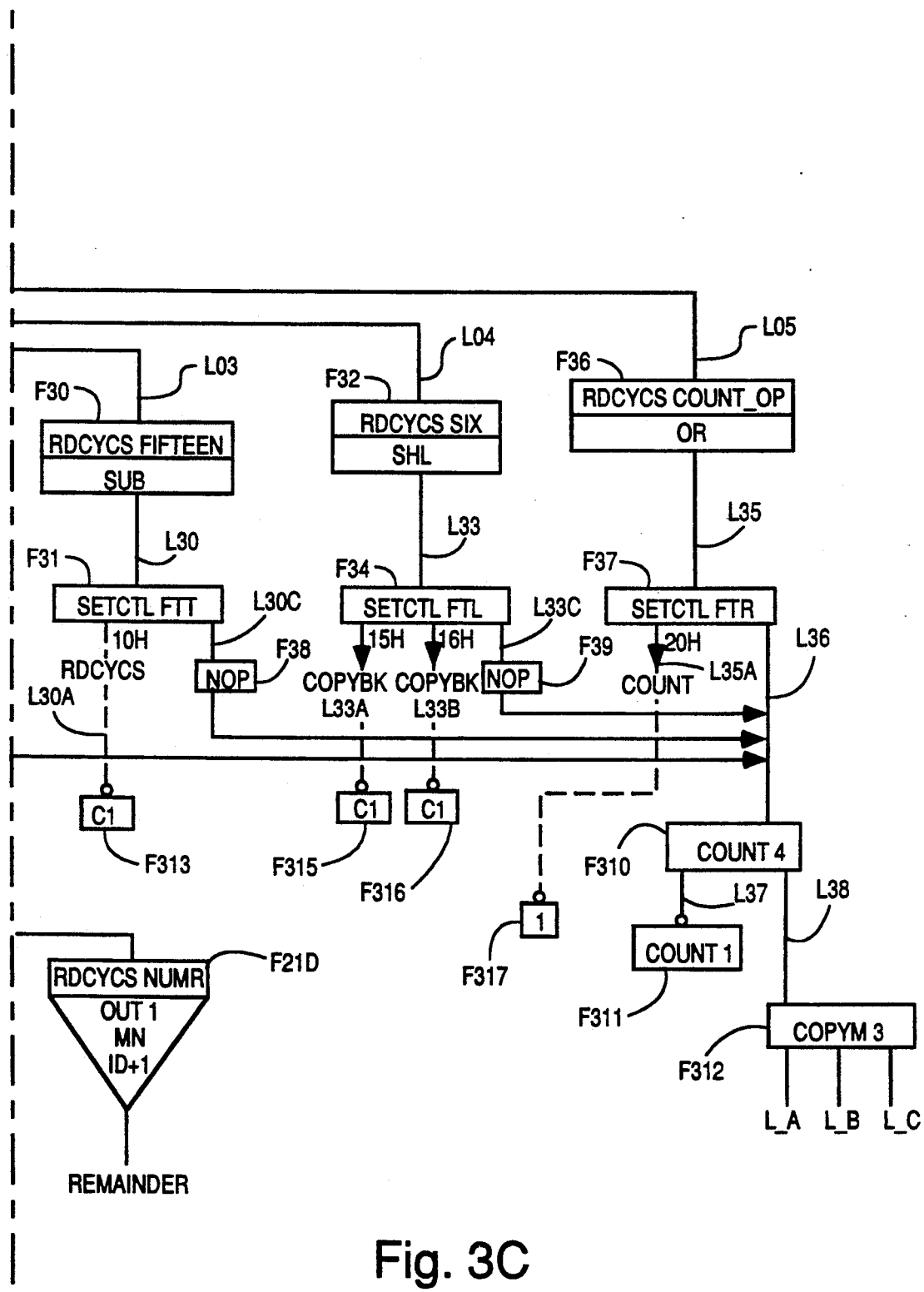

From the data flow diagrams of FIG. 3A, 3B and 3C, the program is easily coded and input as a text file on the host computer. An assembler on the host computer then assembles this file into a hex file consisting of a list of tokens. This file may also contain run time tokens to execute as soon as the program is loaded. The compiled program is loaded through the host data bus 70 into the standard IBM PC bus interface 80 of the DF-1 board and then proceeds to the 9305 Memory Access and General Interface Chip (MAGIC) 90, which provides read/write memory and passes tokens to their destined data flow modules 100-1 through 100-4. The 9305 chip is also a module which processes designated tokens for performing supplemental I/O duties. The tokens in the token list independently find their way to their destinations and perform their assigned specific duties to load the functions and links shown in the data flow graph of FIGS. 3A, 3B and 3C into the module designated by in the program. After the various functions have been loaded, the system can accept data tokens for division.

The output tokens containing the final quotient and remainder can be redirected to memory or to the host computer.

The DF-1 board also provides extra memory in the Image Memory chip 110-2, and memory expansion support 110-3 via the Memory Interface 110-1.

In accordance with the present invention, a method of performing arithmetic division on a data flow machine is disclosed which resolves some of the inefficiencies associated with the conventional subtract until carry method. This method eliminates many of the numerous subtraction operations characterizing the conventional method by performing trial multiplications in the same way long hand division is performed. Furthermore, the method is implemented using data flow techniques to enhance the speed of the division by performing functions in parallel with a minimal memory requirement. As a result of this invention, integer division is performed using fewer clock cycles than a conventional Von Neuman implementation.

```
** UPD7281 ASSEMBLER, V1.0 **     PROGRAM NAME

SOURCE FILE  ; C:IDIV.SRC

OBJECT FILE  ; C:IDIV.LNK

LIST FILE    ; C:IDIV.PRN

ERROR FILE   ;

COMMAND      ; IDIV.SRC

LNO    STNO      SOURCE 1      1      /* A SOURCE PROGRAM FOR THE NEC uPD7281 Data Flow ImPP. . */
  2      2
  3      3      /* PROGRAM NAME: IDIV.SRC
  4
  5                 THE FOLLOWING IS THE PROGRAM FOR AN ImPP PROGRAM
  6                 THAT PERFORMS AN INTEGER DIVIDE.
  7
  8             */
  9      4
 10      5      ;-----------------------------------------------------
 11      6
 12      7      LITERAL  FTN = 'FUNCTION';
 13      8      LITERAL  LNK = 'LINK';
 14      9      LITERAL  MEM = 'MEMORY';
 15     10
 16     11      EQUATE   DUMMY        = 2         ;A DUMMY COUNT SIZE TO BE CHANGED BY SETCTL
 17     12      EQUATE   HOSTMN = 0               ;MODULE NUMBER OF HOST
 18     13      EQUATE   HOSTID = 0               ;ID CHOSEN TO TAG ON TO
 19     14                                        ;OUTPUT TOKEN D
 20     15
 21     16      MODULE   PGMMN = 8                ;MODULE NUMBER OF ImPP
 22     17                                        ;THAT WILL EXECUTE THIS PROGRAM
 23     18
 24     19      LOCATE   DM(64,511)               ;FORCES ANY DM IN POSSIBLE CONFLICT
 25     20                                        ;WITH GE INSTR. OUT OF THE WAY
 26     21
 27     22      ;-----------------------------------------------------
 28     23
 29     24      INPUT                L_MASK;
 30     25      LNK                  = F10(L_MASK);
 31     26      FTN       F10        = WRCYCS(MASK,16);
 32     27      MEM       MASK       = AREA(16);
```

```
LNO  STNO   SOURCE 33   28
 34   29           ;-----------------------------------------------------------
 35   30
 36   31    INPUT                                L_DENOM;
 37   32    LNK            L00,L01                = F00(L_DENOM);
 38   33    FTN            F00                    = NOPSC(XY);
 39   34
 40   35    LNK            L02,L03,L04,L05,L05A   = F01(L01);
 41   36    FTN            F01                    = COPYM(5,0);
 42   37
 43   38    LNK            L06,L07                = F02(L00,L02);
 44   39    FTN            F02                    = SHL(XX),QUEUE(Q0,1);
 45   40    MEM            Q0                     = AREA(1);
 46   41
 47   42    LNK            L08                    = F03(L06,L_A);
 48   43    FTN            F03                    = QUEUE(Q1,1);
 49   44    MEM            Q1                     = AREA(1);
 50   45
 51   46    LNK            L09                    = F04(L07,L_B);
 52   47    FTN            F04                    = QUEUE(Q2,1);
 53   48    MEM            Q2                     = AREA(1);
 54   49
 55   50    LNK            L010                   = F05(L08);
 56   51    FTN            F05                    = RDCYCS(ZERO,1);
 57   52    MEM            ZERO                   = 0;
 58   53
 59   54    LNK            L011,L012              = F06(L010);
 60   55    FTN            F06                    = COPYBK(DUMMY,1)      AT 15H;
 61   56
 62   57    LNK            L013,L014              = F07(L09);
 63   58    FTN            F07                    = COPYBK(DUMMY,0)      AT 16H;
 64   59
 65   60    LNK                                   = F08(,L012);
 66   61    FTN            F08                    = COUNT(1);
 67   62
 68   63    LNK                                   = F09(,L014);
 69   64    FTN            F09                    = COUNT(1);
 70   65
 71   66    LNK            L015                   = F010(L013,L011);
 72   67    FTN            F010                   = SHR,QUEUE(Q3,16);
 73   68    MEM            Q3                     = AREA(16);
 74   69
 75   70           ;-----------------------------------------------------------
 76   71
 77   72    INPUT                                 L_NUMR;
 78   73    LNK            L_N                    = FN(L_NUMR,L_C);
 79   74    FTN            FN                     = QUEUE(QN,1);
 80   75    MEM            QN                     = AREA(1);
 81   76
 82   77    LNK            L20                    = F20(,L_N);
 83   78    FTN            F20                    = WRCYCS(NUMR,1);
 84   79    MEM            NUMR                   = AREA(1);
 85   80
 86   81    LNK            L20                    = F21(L21);
 87   82    FTN            F21                    = RDCYCS(NUMR,1);
 88   83
 89   84    LNK            L22,L23                = F22(L20,L015);
 90   85    FTN            F22                    = SUB(GE,BRC),QUEUE(Q4,16)  AT 5H;
 91   86    MEM            Q4                     = AREA(16);
 92   87
 93   88    LNK            L21,L24,L25            = F23(L22);
 94   89    FTN            F23                    = COPYM(3,0);
 95   90
 96   91    LNK            L25A                   = F23A(L25);
 97   92    FTN            F23A                   = NOP;
 98   93
 99   94    LNK            L24B                   = F23B(L24);
100   95    FTN            F23B                   = RDCYCS(ZERO,1);
101   96
102   97    LNK            L26                    = F24(L25A);
103   98    FTN            F24                    = RDCYCS(MASK,16)      AT 10H;
104   99
105  100    LNK            L25A,L23A,L_N          = F25(L23);
106  101    FTN            F25                    = COPYM(3,0);
107  102
108  103    LNK            L24B                   = F25A(L23A);
109  104    FTN            F25A                   = NOP;
110  105
111  106    LNK            L27                    = F26(L26,L24B);
112  107    FTN            F26                    = AND(CHOP),QUEUE(Q5,1);
113  108    MEM            Q5                     = AREA(1);
114  109
115  110    LNK            L28                    = F27(L27);
116  111    FTN            F27                    = ACC,COUNT(DUMMY)     AT 20H;
117  112
118  113    LNK            L29,L210               = F28(L28);
119  114    FTN            F28                    = NOP(XX);
120  115
121  116    LNK            ANSWER                 = F29(L29);
122  117    FTN            F29                    = OUT1(HOSTMN,HOSTID);
123  118    OUTPUT                                ANSWER;
124  119
125  120    LNK            REM                    = F210(L210);
126  121    FTN            F210                   = OUT1(HOSTMN,HOSTID+1,XCH),RDCYCS(NUMR,1);
```

```
LNO    STNO    SOURCE 127    122     OUTPUT                              REM;
128    123
129    124     ;----------------------------------------------
130    125
131    126     LNK         L39                  = F318(L05A);
132    127     FTN         F318                 = RDCYCS(ZERO,1);
133    128
134    129     LNK         L39A,L39B            = F319(L39)      AT 5H;
135    130     FTN         F319                 = SETCTL(2,0,1111B);
136    131
137    132     LNK         L30                  = F30(L03);
138    133     FTN         F30                  = SUB(XCH),RDCYCS(FIFTEEN,1);
139    134     MEM         FIFTEEN              = 15;
140    135
141    136     LNK         L30A,L30C            = F31(L30)       AT 10H;
142    137     FTN         F31                  = SETCTL(2,0,1111B);     SETS FTT
143    138
144    139     LNK         L33                  = F32(L04);
145    140     FTN         F32                  = SHL,RDCYCS(SIX,1);
146    141     MEM         SIX                  = 6;
147    142
148    143     LNK         L33A,L33B,L33C       = F34(L33)       AT 15H;
149    144     FTN         F34                  = SETCTL(3,0,1110B);     SETS FTL
150    145
151    146     LNK         L35                  = F36(L05);
152    147     FTN         F36                  = OR,RDCYCS(COUNT_OP,1);
153    148     MEM         COUNT_OP             = 0D000H;
154    149
155    150     LNK         L35A,L36             = F37(L35)       AT 20H;
156    151     FTN         F37                  = SETCTL(2,0,1101B);     SETS FTR
157    152
158    153     LNK         L36                  = F321(L39B);
159    154     FTN         F321                 = NOP;
160    155
161    156     LNK         L36                  = F38(L30C);
162    157     FTN         F38                  = NOP;
163    158
164    159     LNK         L36                  = F39(L33C);
165    160     FTN         F39                  = NOP;
166    161
167    162     LNK         L37,L38              = F310(L36);
168    163     FTN         F310                 = COUNT(4);
169    164
170    165     LNK                              = F311(,L37);
171    166     FTN         F311                 = COUNT(1);
172    167
173    168     LNK         L_A,L_B,L_C          = F312(L38);
174    169     FTN         F312                 = COPYM(3,0);
175    170
176    171     LNK                              = F313(,L30A);
177    172     FTN         F313                 = COUNT(1);
178    173
179    174     LNK                              = F315(,L33A);
180    175     FTN         F315                 = COUNT(1);
181    176
182    177     LNK                              = F316(,L33B);
183    178     FTN         F316                 = COUNT(1);
184    179
185    180     LNK                              = F317(,L35A);
186    181     FTN         F317                 = COUNT(1);
187    182
188    183     LNK                              = F320(,L39A);
189    184     FTN         F320                 = COUNT(1);
190    185
191    186     ;----------------------------------------------
192    187
193    188     START;
194    189
195    190     DATA        EXEC    (PGMMN,L_MASK,1000000000000000B);
196    191     DATA        EXEC    (PGMMN,L_MASK,0100000000000000B);
197    192     DATA        EXEC    (PGMMN,L_MASK,0010000000000000B);
198    193     DATA        EXEC    (PGMMN,L_MASK,0001000000000000B);
199    194     DATA        EXEC    (PGMMN,L_MASK,0000100000000000B);
200    195     DATA        EXEC    (PGMMN,L_MASK,0000010000000000B);
201    196     DATA        EXEC    (PGMMN,L_MASK,0000001000000000B);
202    197     DATA        EXEC    (PGMMN,L_MASK,0000000100000000B);
203    198     DATA        EXEC    (PGMMN,L_MASK,0000000010000000B);
204    199     DATA        EXEC    (PGMMN,L_MASK,0000000001000000B);
205    200     DATA        EXEC    (PGMMN,L_MASK,0000000000100000B);
206    201     DATA        EXEC    (PGMMN,L_MASK,0000000000010000B);
207    202     DATA        EXEC    (PGMMN,L_MASK,0000000000001000B);
208    203     DATA        EXEC    (PGMMN,L_MASK,0000000000000100B);
209    204     DATA        EXEC    (PGMMN,L_MASK,0000000000000010B);
210    205     DATA        EXEC    (PGMMN,L_MASK,0000000000000001B);
211    206
212    207
213    208     DATA        EXEC    (PGMMN,L_NUMR,0FFFEH);
214    209     DATA        EXEC    (PGMMN,L_DENOM,0FFFFH);
215    210
216    211     END;
```

UPD7281 ASSEMBLER, V1.0    MEMORY ALLOCATION ERROR LIST

MODULE NAME      MEMORY       TOTAL
PGMMN            DM           4

UPD7281 ASSEMBLER, V1.0    PROGRAM NAME

OBJECT CODE LIST ( *MNEMONIC )   MODULE NAME   PGMMN    NO.  8

DM   SECTION

LOC.   OBJECT      LABEL       MNEMONIC

0005                           ORG      0005H
0005                           DC       0000H
0010                           ORG      0010H
0010                           DC       0000H
0015                           ORG      0015H
0015                           DC       0000H
0020                           ORG      0020H
0020                           DC       0000H
0040                           ORG      0040H
0040                           DC       0000H
0042                           ORG      0042H
0042        ZERO     : DC      0000H
0044                           ORG      0044H
0044        FIFTEEN  : DC      000FH
0045                           DC       0000H
0046        Q0       : DS      0001H
0048                           ORG      0048H
0048                           DC       0000H
004A                           ORG      004AH
004A        NUMR     : DS      0001H
004B                           DC       0000H
004C        Q1       : DS      0001H
004E                           ORG      004EH
004E                           DC       0000H
0050                           ORG      0050H
0050                           DC       0001H
0052                           ORG      0052H
0052        Q3       : DS      0010H
0062        Q4       : DS      0010H
0072        MASK     : DS      0010H
0082        Q2       : DS      0001H
0084                           ORG      0084H
0084        Q5       : DS      0001H
0086                           ORG      0086H
0086        COUNT_OP : DC      D000H
0088                           ORG      0088H
0088        SIX      : DC      0006H
008A                           ORG      008AH
008A        QN       : DS      0001H

DM   68 WORDS USED

LT   SECTION

LOC.   OBJECT      LABEL       MNEMONIC 0000   0C39        L00      : PU      L06    , F02    , 0
0001   0602        L01      : GE      L02    , F01    , 0
0002   1A42        L22      : GE      L21    , F23    , 0
0003   2A5A        L23      : GE      L25A   , F25    , 0
0004   1415        L015     : PU      L22    , F22    , 1
0005   4C07        L39A     : AG&FC   L00    , F320   , 1
0006   6509        L39B     : PU      L36    , F321   , 0
0007   1CCB        L06      : AG&FC   L08    , F03    , 0
0008   20DB        L07      : AG&FC   L09    , F04    , 0
0009   6007        L37      : AG&FC   L00    , F311   , 1
000A   622A        L38      : GE      L_A    , F312   , 0
000B   4800        L29      : OUT     REM    , F29    , 0
000C   5C08        L210     : OUT     0001H  , F210   , 0
000D   466B        L_NUMR   : AG&FC   L_N    , FN     , 0
000E   1411        L30      : PU      L32    , F22    , 0
000F   0882        L30      : GE      L30A   , F31    , 0
0010   6407        L30A     : AG&FC   L00    , F313   , 1
0011   4509        L30C     : PU      L36    , F38    , 0
0012   20AA        L33      : GE      L33A   , F34    , 0
0013   3502        L35      : GE      L35A   , F37    , 0
0014   30D1        L26      : PU      L27    , F26    , 0
0015   6807        L33A     : AG&FC   L00    , F315   , 1
0016   5407        L33B     : AG&FC   L00    , F316   , 1
0017   4D09        L33C     : PU      L36    , F39    , 0
0018   30D5        L24B     : PU      L27    , F26    , 1
0019   28FB        L08      : AG&FC   L010   , F05    , 0
001A   80E1        L27      : PU      L28    , F27    , 0
001B   5A72        L09      : GE      L013   , F07    , 0
001C   3C59        L28      : PU      L29    , F28    , 0
001D   0403        L_MASK   : AG&FC   L00    , F10    , 0

LT SECTION

| LOC. | OBJECT | LABEL | | MNEMONIC | | | |
|------|--------|-------|---|----------|------|------|---|
| 001E | 002A | L39 | : | GE | L39A | , F319 | , 0 |
| 001F | 5682 | L010 | : | GE | L011 | , F06 | , 0 |
| 0020 | 5807 | L35A | : | AG&FC | L00 | , F317 | , 1 |
| 0021 | 484B | L36 | : | AG&FC | L37 | , F310 | , 0 |
| 0022 | 4001 | L_DENOM | : | PU | L00 | , F00 | , 0 |
| 0040 | | | | ORG | 0040H | | |
| 0040 | 0C3D | L02 | : | PU | L06 | , F02 | , 1 |
| 0041 | 1079 | L03 | : | PU | L30 | , F30 | , 0 |
| 0042 | 2491 | L04 | : | PU | L33 | , F32 | , 0 |
| 0043 | 3899 | L05 | : | PU | L35 | , F36 | , 0 |
| 0044 | 00F3 | L05A | : | AG&FC | L39 | , F318 | , 0 |
| 0045 | 1CCF | L_A | : | AG&FC | L08 | , F03 | , 1 |
| 0046 | 20DF | L_B | : | AG&FC | L09 | , F04 | , 1 |
| 0047 | 466F | L_C | : | AG&FC | L_M | , FN | , 1 |
| 0048 | 1873 | L21 | : | AG&FC | L20 | , F21 | , 0 |
| 0049 | 2CC3 | L24 | : | AG&FC | L24B | , F23B | , 0 |
| 004A | 1E59 | L25 | : | PU | L25A | , F23A | , 0 |
| 004B | 40A3 | L25A | : | AG&FC | L26 | , F24 | , 0 |
| 004C | 2CC1 | L23A | : | PU | L24B | , F25A | , 0 |
| 004D | 0877 | L_N | : | AG&FC | L20 | , F20 | , 1 |
| 004E | 5021 | L013 | : | PU | L015 | , F010 | , 0 |
| 004F | 3C07 | L014 | : | AG&FC | L00 | , F09 | , 1 |
| 0050 | 5025 | L011 | : | PU | L015 | , F010 | , 1 |
| 0051 | 3407 | L012 | : | AG&FC | L00 | , F08 | , 1 |

LT 53 WORDS USED

FT SECTION

| LOC. | OBJECT | LABEL | | MNEMONIC | | |
|------|--------|-------|---|----------|------|------|
| 0000 | 0210 0000 | F318 | : | RDCYCS | ZERO | ,0001H |
| 0000 | | | | ORG | 0000H | |
| 0000 | 0C0F | F319 | : | SETCTL | 0002H | |
| 0001 | 139F 0000 | F10 | : | WRCYCS | MASK | ,0010H |
| 0001 | | | | ORG | 0001H | |
| 0001 | 04C0 | F01 | : | COPYM | 0005H | |
| 0002 | 1250 0000 | F20 | : | WRCYCS | NUMR | ,0001H |
| 0002 | | | | ORG | 0002H | |
| 0002 | 0C0F | F31 | : | SETCTL | 0002H | |
| 0003 | 2804 | F02 | : | SHL | XX ,FULL | |
| | 3230 0000 | | | QUEUE | Q0 | ,0001H |
| 0004 | 3019 | F30 | : | SUB | XCHFULL | |
| | 0220 0000 | | | RDCYCS | FIFTEEN | ,0001H |
| 0005 | 22B9 | F22 | : | SUB | BRC,GE ,FULL | |
| | 331F 0000 | | | QUEUE | Q4 | ,0010H |
| 0006 | 0250 0000 | F21 | : | RDCYCS | NUMR | ,0001H |
| 0006 | | | | ORG | 0006H | |
| 0006 | 0440 | F23 | : | COPYM | 0003H | |
| 0007 | 3260 0000 | F03 | : | QUEUE | Q1 | ,0001H |
| 0007 | | | | ORG | 0007H | |
| 0007 | 001B | F23A | : | NOP | | |
| 0008 | 3410 0000 | F04 | : | QUEUE | Q2 | ,0001H |
| 0008 | | | | ORG | 0008H | |
| 0008 | 0C4E | F34 | : | SETCTL | 0003H | |
| 0009 | 2004 | F32 | : | SHL | FULL | |
| | 0440 0000 | | | RDCYCS | SIX | ,0001H |
| 000A | 0210 0000 | F05 | : | RDCYCS | ZERO | ,0001H |
| 000A | | | | ORG | 000AH | |
| 000A | 0440 | F25 | : | COPYM | 0003H | |
| 000B | 0210 0000 | F23B | : | RDCYCS | ZERO | ,0001H |
| 000B | | | | ORG | 000BH | |
| 000B | 001B | F25A | : | NOP | | |
| 000C | 2101 | F26 | : | AND | CNOP,FULL | |
| | 3420 0000 | | | QUEUE | Q5 | ,0001H |
| 000D | D000 0000 | F08 | : | COUNT | 0001H | |
| 000D | | | | ORG | 000DH | |
| 000D | 0C0D | F37 | : | SETCTL | 0002H | |
| 000E | 2000 | F36 | : | OR | FULL | |
| | 0430 0000 | | | RDCYCS | COUNT_OP,0001H | |
| 000F | D000 0000 | F09 | : | COUNT | 0001H | |
| 000F | | | | ORG | 000FH | |
| 000F | 081B | F28 | : | NOP | XX | |
| 0010 | 0C1F | F00 | : | NOPSC | XY | |
| 0010 | 039F 0000 | F24 | : | RDCYCS | MASK | ,0010H |
| 0011 | 3450 0000 | FN | : | QUEUE | QN | ,0001H |
| 0011 | | | | ORG | 0011H | |
| 0011 | 001B | F38 | : | NOP | | |
| 0012 | 0000 | F29 | : | OUT1 | 0,0000H | |
| 0012 | D003 0000 | F310 | : | COUNT | 0004H | |
| 0013 | 001B | F39 | : | NOP | | |
| 0013 | D000 0000 | F320 | : | COUNT | 0001H | |
| 0014 | 2006 | F010 | : | SHR | FULL | |
| | 329F 0000 | | | QUEUE | Q3 | ,0010H |
| 0015 | 0040 | F06 | : | COPYBK | 0002H | |
| 0015 | D000 0000 | F316 | : | COUNT | 0001H | |
| 0016 | 0040 | F07 | : | COPYBK | 0002H | |
| 0016 | D000 0000 | F317 | : | COUNT | 0001H | |

```
** FT    SECTION **

LOC.   OBJECT         LABEL         MNEMONIC 0017   3000           F210       :  OUT1        0,0001H,XCH,FULL
       0250 0000                    RDCYCS      NUMR    ,0001H
0018   D000 0000      F311       :  COUNT       0001H
0018                                ORG         0018H
0018   0440           F312       :  COPYM       0003H
0019   0018           F321       :  NOP
0019   D000 0000      F313       :  COUNT       0001H
001A   D000 0000      F315       :  COUNT       0001H
0020                                ORG         0020H
0020   2212           F27        :  ACC         FULL
       D001 0000                    COUNT       0002H

** FTL   27 WORDS USED **
** FTR   28 WORDS USED **
** FTT   28 WORDS USED **

OBJECT CODE LIST ( MNEMONIC )     MODULE NAME              NO.

** DATA SECTION **

LOC.   OBJECT         LABEL         MNEMONIC

----   81D08000                     EXEC        L_MASK  ,8000H
----   81D04000                     EXEC        L_MASK  ,4000H
----   81D02000                     EXEC        L_MASK  ,2000H
----   81D01000                     EXEC        L_MASK  ,1000H
----   81D00800                     EXEC        L_MASK  ,0800H
----   81D00400                     EXEC        L_MASK  ,0400H
----   81D00200                     EXEC        L_MASK  ,0200H
----   81D00100                     EXEC        L_MASK  ,0100H
----   81D00080                     EXEC        L_MASK  ,0080H
----   81D00040                     EXEC        L_MASK  ,0040H
----   81D00020                     EXEC        L_MASK  ,0020H
----   81D00010                     EXEC        L_MASK  ,0010H
----   81D00008                     EXEC        L_MASK  ,0008H
----   81D00004                     EXEC        L_MASK  ,0004H
----   81D00002                     EXEC        L_MASK  ,0002H
----   81D00001                     EXEC        L_MASK  ,0001H
----   80D0FFFE                     EXEC        L_NUMR  ,FFFEH
----   8220FFFF                     EXEC        L_DENOM ,FFFFH

ASSEMBLY COMPLETE,   0 ERROR(S),   0 WARNING(S) FOUND
```

I claim:

1. A method of operating a computer wherein said computer comprises a data flow processor, said method comprising:
   (1) inputting a numerator N and a denominator D into a storage location;
   (2) determining the number of leading zeros L in said denominator;
   (3) forming a trial multiplier table including powers of two, said trial multiplier table including the value $2^L$;
   (4) forming a mask entry table of left shifted denominator values, each mask entry table value formed by multiplying said denominator by an associated trial multiplier;
   (5) storing said numerator as a new numerator;
   (6) performing trial subtractions with successive values of said mask entry table from said new numerator until a selected mask entry table value yields a smallest positive subtraction result;
   (7) forming a subquotient token containing said associated trial multiplier associated with said selected mask entry table value;
   (8) storing said smallest positive subtraction result as said new numerator;
   (9) repeating steps (6), (7) and (8) until no mask entry table value, when subtracted from said new numerator, yields a positive subtraction result;
   (10) forming a quotient comprising the sum of said subquotients; and
   (11) forming a remainder by reading said new numerator.

2. A method of operating a computer wherein said computer comprises a data flow processor, said method comprising:
   (1) inputting a numerator N and a denominator D into a storage location;
   (2) determining the number of leading zeros K in said numerator;
   (3) forming a trial multiplier table including powers of two, said trial multiplier table including the value $2^K$;
   (4) forming a mask entry table of left shifted denominator values, each mask entry table value formed by multiplying said denominator by an associated trial multiplier;
   (5) storing said numerator as a new numerator;
   (6) performing trial subtractions with successive values of said mask entry table from said new numerator until a selected mask entry table value yields a smallest positive subtraction result;
   (7) forming a subquotient token containing said associated trial multiplier associated with said selected mask entry table value;
   (8) storing said smallest positive subtraction result as said new numerator;
   (9) repeating steps (6), (7) and (8) until no mask entry table value, when subtracted from said new numerator, yields a positive subtraction result;

(10) forming a quotient comprising the sum of said subquotients; and
(11) forming a remainder by reading said new numerator.

3. The method of claim 1 or claim 2 wherein said data flow processor is an NEC μPD7281 data flow processor.

4. A device for performing arithmetic division on a data flow processor comprising:

numerator input means for receiving a numerator into said data flow processor;

denominator input means for receiving a denominator into said data flow processor;

mask memory means for storing a table of binary trial multipliers of powers of two in order of decreasing value;

leading zero means receiving said denominator for providing a count of the number of leading zeros of said denominator;

left shift means receiving said denominator and said count of the number of leading zeros for providing a normalized left shifted denominator by performing a sequence of left bit shifts on said denominator a number of times equal to said count of the number of leading zeros;

first copy means receiving a zero value for generating a series of incremented copies of said zero value equal in number to no less than said count of the number of leading zeros whereby each successive copy has a value of one (1) greater than the previous copy;

second copy means receiving said normalized left shifted denominator for making a number of copies of said normalized left shifted denominator equal to no less than said count of the number of leading zeros;

right shift means receiving said series of incremented copies of said zero value and said copies of said normalized left shifted denominator for generating a series of left shifted denominators by performing a right shift on each copy of said normalized left shifted denominator received by the number of times equal to the value of each incremented zero value received;

memory means receiving said numerator and a subtraction result for storing a new numerator;

subtraction means receiving said series of left shifted denominators and said new numerator for providing said subtraction result by performing a subtraction of said left shifted denominator from new numerator;

zero read means receiving said subtraction result from said subtraction means for providing a zero valued trial multiplier whenever said subtraction result is less than or equal to zero;

mask read means receiving said subtraction result from said subtraction means for reading a predetermined binary trial multiplier stored by said mask memory means whenever said subtraction result is greater than zero;

accumulating means receiving said predetermined binary trial multipliers and for providing a quotient by forming a sum of said predetermined binary trial multipliers received; and remainder means for providing a remainder by reading a last new numerator.

5. The device of claim 4 wherein said data flow processor is an μPD7281 data flow processor.

* * * * *